Patented Nov. 13, 1934

1,980,711

UNITED STATES PATENT OFFICE 1,980,711

PURIFICATION OF ALIPHATIC MONOCARBOXYLIC ACID ESTERS

William J. Bannister and Ignace J. Krchma, Terre Haute, Ind., assignors to Commercial Solvents Corporation, Terre Haute, Ind., a corporation of Maryland No Drawing. Application September 15, 1930, Serial No. 482,153

4 Claims. (Cl. 260—106)

The present invention relates to a method of recovering esters from their corresponding alcoholic solutions. More specifically it relates to a process for the separation of an alcohol such as butyl alcohol, which is somewhat soluble in water, from a corresponding ester such as butyl acetate, which is substantially less soluble in water than the alcohol.

In the production of esters such as butyl acetate from butanol and acetic acid, it is customary to use an excess of the alcohol in order to drive the reaction to completion, to insure a neutral product, etc. When the esterification is complete, therefore, the product consists of a solution of butyl acetate in butanol. Likewise, in similar esterification processes a solution of the ester in the corresponding alcohol is obtained.

In some instances these mixtures of esters and alcohols may be used without separating them. For example, in the nitrocellulose lacquer industry it has been the custom in the past to employ butyl acetate containing approximately 15% of butanol. In many industries, however, a pure grade of ester is highly essential, and even in the lacquer industry where the greatest amount of butyl acetate is used, a pure grade of ester would be desirable in order to permit more accurate formulation.

In the past, the expense of producing butyl acetate of high ester content has necessitated the use of grades containing appreciable amounts of butanol. Since butanol and butyl acetate form a constant boiling mixture which boils only one degree centigrade below the boiling point of butanol, the concentration of the ester by fractionation involves the use of a high reflux ratio. This, of course, reduces the capacity of a given still and increases greatly the cost of refining. Furthermore, in concentrating by distillation, a constant-boiling mixture containing 55% butyl acetate is obtained, and this cannot be further concentrated by distilling. Steam distillation is likewise impractical since the ternary constant boiling mixture of butanol, butyl acetate, and water boils only four degrees below the boiling point of butanol.

Thus it is readily seen that separation of butyl acetate from mixtures with butanol by distillation is impractical, and leads to the two alternatives of more careful control of the proportion of acid and alcohol in the esterification or the use of other methods of purification.

In certain other processes also, as for example, that disclosed in U. S. Patent 1,708,460, issued April 9, 1929 to F. C. Zeisberg, alcohol-ester mixtures are obtained which contain still higher proportions of alcohols than in the products from ordinary esterification methods. The difficulty of obtaining pure esters from such solutions is of course greater than in the customary esterification processes.

The present invention provides a new and efficient method of obtaining mixtures of any desired ester content from alcohol-ester mixtures containing varying proportions of the latter constituents. Of a number of possible methods investigated, it has been found that the method of concentrating the ester by preferential extraction of the alcohol by water was the most satisfactory. For example, at 20° C. n-butyl alcohol has a solubility in water of 8%, while n-butyl acetate is relatively insoluble. Thus, at room temperature one liter of water is capable of dissolving 62 c. c. of n-butyl alcohol from a solution of n-butyl acetate when the concentration of the latter in the solvent layer is 25% by volume at equilibrium. At the same time only 1.9 c. c. of n-butyl acetate are dissolved by the water.

For the extraction, two methods are available: "batch extraction" and "countercurrent extraction by steps". Batch extraction comprises simply extracting a quantity of material successively with several volumes of the extracting agent. Countercurrent extraction by steps involves the use of two or more extraction tanks. For example, if a three-step extraction is desired, an equal volume of the liquid to be extracted is placed in each of three tanks, A, B, and C. A previously determined volume of extracting medium is then placed in A and the mixture brought to equilibrium by agitation. After this step the extracting layer is advanced to B and similarly treated there; finally it is put through the same treatment in C. At this point the residue in A is removed, and the residue in B is advanced to A. The residue in C is placed in B and a fresh batch of the material to be extracted is placed in C. The system is then ready for another treatment with a batch of extracting medium passing from A to C. The residues are again transferred, and after several cycles an equilibrium is attained whereby the most extracted material is always present in A and the least in C. In this way the countercurrent principle is applied to extraction with immiscible liquids and a much greater efficiency is attained than by the use of the batch method.

In carrying out this invention, three factors must be determined: (a) whether the method of batch extraction or that of countercurrent extraction by steps is to be employed; (b) the number of steps in which the extraction is to be carried out; and (c) the total quantity of extracting medium to be employed. The first two of these factors depend upon balancing the relative advantages of operating simplicity and extraction efficiency. The batch method is much simpler, and the method of countercurrent extraction by steps is more efficient, so the choice of the method to be applied to any initial ester concentration will depend upon economic considerations. The same may be said of the choice of the number of steps to be used. The following table shows the choice of these two factors which have been found suitable for various initial concentrations of butyl acetate:

Table I

| Ester content of the solution to be extracted | Extraction method recommended | Number of steps recommended |
|---|---|---|
| 70-85 | Batch | 2-5 |
| 55-70 | Countercurrent | 3-4 |
| 35-55 | ----do---- | 4-5 |
| 15-35 | ----do---- | 5-6 |

The third factor to be determined is the total volume of water to be employed in the extraction. This will depend upon the initial concentration, the final concentration desired, and the number of steps used. If the number of steps and the procedure indicated in the above table are employed, it has been found that the following formula will give a rough approximation of the number of volumes of water to be used per volume of the initial alcohol-ester mixture:

$$\frac{10(C_2-C_1)}{100-C_1} = N \text{ (approximately)}$$

$C_1$=initial percent butyl acetate by weight
$C_2$=percent by weight of butyl acetate desired
$N$=total number of volumes required to extract one volume of the initial mixture.

While the above table and formula were determined for butyl acetate, the recommendations hold generally for other esters of this type. This process is applicable to all ester-alcohol mixtures in which the alcohol is somewhat water-soluble, and the ester is substantially less soluble, and preferably insoluble or only very slightly soluble in water. Esters of this type, other than butyl acetate, are butyl propionate, butyl butyrate, propyl propionate, propyl butyrate, etc.

It is to be distinctly understood, however, that this invention is not to be taken as limited to the exact conditions determined by the table and formula. These conditions are only approximate and will vary in individual cases. For example, the conditions will be slightly different for different sized charges, and for different conditions of equilibrium according to the efficiency of the agitation, etc. The conditions will also vary somewhat according to the particular ester-alcohol mixture to be dealt with and according to the temperature at which the extraction is to be carried out. With regard to this last point, it is known that the solubility of alcohols such as butyl, iso-butyl, amyl, iso-amyl, etc. decreases with increasing temperature from 0° to 40-60° C., so that less water will be needed for the extraction at low temperatures. The table and formula are based on the use of atmospheric temperatures, but if different temperatures are employed, one skilled in the art can easily adjust the amount of water to be used, corresponding to the change in solubility of the alcohol.

It may be said that, in general, the conditions determined by the table and formula are operable, but that to secure optimal results in any particular case, the conditions may have to be somewhat modified. The efficiency of the operating conditions chosen may easily be determined by one skilled in the art, from the ester content of the water extract and the alcohol content of the residue; and from the results of such determinations, the conditions may easily be adjusted to the optimum.

In carrying out this invention, the ester-alcohol mixture is extracted by either the batch method or the countercurrent method, as described above, yielding a concentrated ester and a water extract. The water extract will contain the alcohol in amounts up to the saturation value, and smaller amounts of ester. These are recovered by steam distillation and may be added to the next batch of alcohol to be used in the esterification. The extracted material, of course, contains a small amount of water, which may be removed by distillation, leaving as the final product pure concentrated ester.

The method of obtaining high ester content material from 75-85% crude butyl acetate may be illustrated by the following example: 400 c. c. of 82% butyl acetate (by weight) were extracted three times with one liter of water each time. A solvent layer of 320 c. c. was recovered, which after dehydration analyzed 93.6% butyl acetate. A water layer comprising 3080 c. c. of 1.45% butanol, 0.75% butyl acetate, and 97.8% water was also recovered. This layer was subjected to steam distillation, and the solvent fraction recovered in the form of a two phase constant-boiling mixture with water. This solvent mixture, when dehydrated, comprises butanol and a small percentage of butyl acetate, which may be added to the next batch of butanol to be used in the esterification. Or, if desired, the mixture may be distilled and the ester recovered in the form of its constant boiling mixture with butanol. The recovered ester may then be added to a succeeding batch of low ester content material to be extracted, and the butanol used, as before, for esterification.

The above example and a number of others illustrating the method of operation for butyl acetate mixtures of different ester content will be found in tabular form in Table II.

Table II

| Example no. | Percent BuAc by wt. in initial sol. | Method, batch or countercurrent | Number of steps | Total volume of water used per volume of solution | Percent by volume of original material recovered | Percent BuAc by wt. ester in recovered material |
|---|---|---|---|---|---|---|
| 1 | 82 | Batch | 3 | 7.5 | 78 | 93.6 |
| 2 | 80 | ----do---- | 2 | 2.6 | 91 | 85.0 |
| 3 | 70 | ----do---- | 2 | 7.4 | 70 | 85.0 |
| 4 | 52.5 | Countercurrent | 5 | 8.2 | 33 | 96.2 |
| 5 | 52.5 | ----do---- | 5 | 7.5 | 40 | 92.0 |
| 6 | 52.5 | ----do---- | 5 | 6.8 | 50 | 87.6 |
| 7 | 27.2 | ----do---- | 5 | 11.2 | 20 | 91.7 |
| 8 | 27.2 | ----do---- | 5 | 9.0 | 22.5 | 85.2 |
| 9 | 15.4 | ----do---- | 5 | 10.0 | 8.0 | 90.2 |

It is to be understood that while the usual mixture is that of the ester in its corresponding alcohol, this method is equally applicable to cases in which the ester is in solution in a different alcohol. For example, a number of esters can best be prepared by alcoholysis, and in this case the resulting mixture will contain the ester, the corresponding alcohol, and the alcohol of the original ester. One or both of the alcohols, depending upon their boiling points, the boiling points of any constant-boiling mixtures, the mutual solubilities, etc., may be found to be best removed by the present method of water extraction. The preparation of methyl isovaleriate from butyl isovaleriate illustrates a procedure of this nature. The mixture containing methyl isovaleriate, butyl alcohol and methyl alcohol is distilled to remove most of the methyl alcohol. The butyl alcohol and the methyl isovaleriate are found to distill over together, so the present method of extracting the alcohol with water is found to be most suitable for the separation.

It is to be further understood that the examples described above are only illustrative, and this invention is to be in no way limited to the specific conditions specified. Various modifications which would occur to one skilled in the art may be applied to this process without departing from the spirit of the invention. For example, instead of using the countercurrent extraction by steps, a column may be used, and true countercurrent extraction employed.

The invention now having been described, what is claimed is:

1. A process for increasing the concentration of a substantially water-insoluble aliphatic monocarboxylic acid ester in a solution comprising essentially said ester and a substantial proportion of an aliphatic monohydric alcohol which is more soluble in water than said ester, which comprises extracting said mixture, a plurality of times, with water, the total volume of water per volume of initial mixture being approximately N volumes in the following formula:

$$N = \frac{10(C_2 - C_1)}{100 - C_1}$$

where $C_1$ equals the initial percentage concentration of ester by weight and $C_2$ equals the weight percentage concentration of ester desired.

2. A process for increasing the concentration of a substantially water-insoluble aliphatic monocarboxylic acid ester in a solution comprising essentially said ester and a substantial proportion of an aliphatic monohydric alcohol which is more soluble in water than said ester, which comprises subjecting the mixture to extraction with water, by the method of step by step extraction which utilizes the counter-current principle, the total volume of water per volume of initial mixture being approximately N volumes in the following formula:

$$N = \frac{10(C_2 - C_1)}{100 - C_1}$$

where $C_1$ equals the initial percentage concentration of ester by weight and $C_2$ equals the weight percentage concentration of ester desired.

3. A process for concentrating a solution of butyl acetate in butyl alcohol which comprises extracting said mixture, a plurality of times, with water, the total volume of water per volume of initial mixture being approximately N volumes in the following formula:

$$N = \frac{10(C_2 - C_1)}{100 - C_1}$$

where $C_1$ equals the initial percentage concentration of butyl acetate by weight and $C_2$ equals the weight percentage concentration of ester desired.

4. A process for concentrating a solution of butyl acetate in butyl alcohol which comprises subjecting the mixture to extraction with water by the method of step by step extraction which utilizes the counter-current principle, the total volume of water per volume of initial mixture being approximately N volumes in the following formula:

$$N = \frac{10(C_2 - C_1)}{100 - C_1}$$

where $C_1$ equals the initial percentage concentration of butyl acetate by weight and $C_2$ equals the weight percentage concentration of ester desired.

WILLIAM J. BANNISTER.
IGNACE J. KRCHMA.